United States Patent [19]

Schreiner et al.

[11] 4,280,956
[45] Jul. 28, 1981

[54] PHTHALOCYANINE REACTIVE DYESTUFFS

[75] Inventors: Kurt Schreiner, Hoenebach; Horst Jäger; Richard Schwaebel, both of Leverkusen, all of Fed. Rep. of Germany

[73] Assignee: Bayer Aktiengesellschaft, Leverkusen, Fed. Rep. of Germany

[21] Appl. No.: 43,050

[22] Filed: May 29, 1979

[30] Foreign Application Priority Data

Jun. 28, 1978 [DE] Fed. Rep. of Germany ....... 2828227

[51] Int. Cl.$^3$ ...................... C09B 47/04; C09B 47/30
[52] U.S. Cl. ............................. 260/242.2; 260/245.1; 260/314.5
[58] Field of Search ................ 260/242.2, 245.1, 314.5

[56] References Cited

U.S. PATENT DOCUMENTS

| 3,082,201 | 3/1963 | Koller | 260/242.2 X |
| 3,096,340 | 7/1963 | Tartter et al. | 260/242.2 X |
| 3,105,070 | 9/1963 | Bitterli | 260/242.2 |
| 3,126,377 | 3/1964 | Tartter et al. | 260/242.2 |
| 3,752,801 | 8/1973 | Hoelzle | 260/242.2 X |
| 3,989,692 | 11/1976 | Jager et al. | 260/242.2 X |

FOREIGN PATENT DOCUMENTS

| 1091178 | 11/1967 | United Kingdom . |
| 1188606 | 4/1970 | United Kingdom . |
| 1208553 | 10/1970 | United Kingdom . |
| 1227538 | 4/1971 | United Kingdom . |
| 1348149 | 3/1974 | United Kingdom . |
| 1526840 | 10/1978 | United Kingdom . |
| 1549820 | 8/1979 | United Kingdom . |

Primary Examiner—Richard Raymond
Attorney, Agent, or Firm—Sprung, Felfe, Horn, Lynch & Kramer

[57] ABSTRACT

Phthalocyanine reactive dyestuffs of the formula

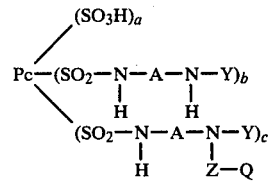

wherein
Pc, A, Z, Y, Q, a, b and c have the meaning given in the description, and their use for dyeing and printing materials containing hydroxyl groups or containing amide groups, such as textile fibres, yarns and fabrics consisting of wool, silk, synthetic polyamide fibres and polyurethane fibres, and for wash-fast dyeing and printing of natural or regenerated cellulose.

6 Claims, No Drawings

PHTHALOCYANINE REACTIVE DYESTUFFS

The present invention relates to phthalocyanine reactive dyestuffs which in the form of the free acid corresponding to the formula I

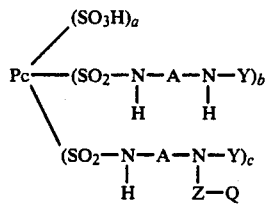

wherein
Pc = the radical of a phthalocyanine,
A = an alkylene radical with at least 2 C atoms,
Z = an alkylene radical,
Y = a reactive group,
Q = a group which confers solubility in water,
a = 0–2,
b = 0–2,
c = 1–4 and
a+b+c ≦ 4.

The phthalocyanine radical Pc can be metal-free but preferably contains metal. Suitable metals are cobalt, nickel and copper.

In dyestuffs of the formula (I), each sulphonic acid group or sulphonamide group is bonded, in the 3- or 4-position, to a different benzene ring of the phthalocyanine.

The alkylene radicals represented by A are preferably alkylene radicals with 2 to 6 C atoms, such as, for example, trimethylene, propylene, tetramethylene, cyclohexylene and especially ethylene radicals.

The alkylene radicals represented by Z are preferably alkylene radicals with 1–6 C atoms, such as, for example, methylene, ethylene, propylene, isopropylene and butylene radicals.

The group Q is, for example, a carboxyl, sulpho, sulphato or disulphimide group. The disulphimide group has the formula II

In this formula, $R_1$ denotes a lower alkyl radical, that is to say an alkyl radical with 1–6 C atoms, or an aryl radical which may optionally be substituted further. Examples of $R_1$ are the methyl, n-butyl, phenyl, tolyl, p-chlorophenyl or naphthyl radical.

The alkylene radicals can be straight-chain or branched.

Reactive groups Y are to be understood as groups which possess one or more reactive groups or removable substituents which, on applying the dyestuffs to cellulose materials in the presence of acid-binding agents and, if necessary, with exposure to heat, can react with the hydroxyl groups of the cellulose, or, on application to high molecular weight polyamide fibres, such as wool, can react with the NH group of these fibres, to form covalent bonds. A large number of such fibre-reactive groupings are known from the literature.

Reactive groups which are suitable according to the invention and which contain at least one removable substituent bonded to a heterocyclic radical or to an aliphatic radical, are, inter alia, those which contain at least one reactive substituent bonded to a 5-membered or 6-membered heterocyclic ring, such as to a monazine, diazine or triazine ring, for example pyridine, pyrimidine, pyridazine, pyrazine, thiazine, oxazine or asymmetrical or symmetrical triazine ring, or to a ring system of this type which possesses one or more fused aromatic rings, such as a quinoline, phthalazine, cinnoline, quinazoline, quinoxaline, acridine, phenazine and phenanthridine ring system; the 5-membered or 6-membered heterocyclic rings which possess at least one reactive substituent are, accordingly, preferably those which contain one or more nitrogen atoms and can contain fused 5-membered or preferably 6-membered carbocyclic rings.

Amongst examples of the reactive substituents on the heterocyclic ring there may be mentioned: halogen (Cl, Br or F), ammonium, including hydrazinium, sulphonium, sulphonyl, azido-($N_3$), thiocyanato, thio, thioether, hydroxyether, sulphinic acid and sulphonic acid. Specific examples which may be mentioned are: monohalogeno- or dihalogeno-symmetrical-triazinyl radicals, for example 2,4-dichlorotriazinyl-6, 2-amino-4-chlorotriazinyl-6, 2-alkylamino-4-chlorotriazinyl-6, such as 2-methylamino-4-chlorotriazinyl-6, 2-ethylamino- or 2-propylamino-4-chlorotriazinyl-6, 2-β-hydroxyethylamino-4-chlorotriazinyl-6-, 2-di-β-hydroxyethylamino-4-chlorotriazinyl-6 and the corresponding sulphuric acid half-esters, 2-diethylamino-4-chlorotriazinyl-6, 2-morpholino- or 2-piperidino-4-chlorotriazinyl-6, 2-cyclohexylamino-4-chlorotriazinyl-6, 2-arylamino- and substituted arylamino-4-chlorotriazinyl-6, such as 2-phenylamino-4-chlorotriazinyl-6, 2-(o-, m- or p-carboxyphenyl or sulphophenyl)-amino-4-chlorotriazinyl-6, 2-alkoxy-4-chlorotriazinyl-6, such as 2-methoxy- or ethoxy-4-chlorotriazinyl-6, 2-(phenylsulphonylmethoxy)-4-chlorotriazinyl-6, 2-aryloxy- and substituted aryloxy-4-chlorotriazinyl-6, such as 2-phenoxy-4-chlorotriazinyl-6, 2-(p-sulphophenyl)-oxy-4-chlorotriazinyl-6, 2-(o-, m- or p-methylphenyl or methoxyphenyl)-oxy-4-chlorotriazinyl-6, 2-alkylmercapto- or 2-arylmercapto- or 2-(substituted aryl)-mercapto-4-chlorotriazinyl-6, such as 2-β-hydroxyethylmercapto-4-chlorotriazinyl-6, 2-phenylmercapto-4-chloro-triazinyl-6, 2-(4'-methylphenyl)-mercapto-4-chlorotriazinyl-6 and 2-(2',4'-dinitro)-phenylmercapto-4-chlorotriazinyl-6, 2-methyl-4-chlorotriazinyl-6, 2-phenyl-4-chlorotriazinyl-6, for example 2,4-difluorotriazinyl-6, 2-amino-4-fluorotriazinyl-6, 2-alkylamino-4-fluorotriazinyl-6, such as 2-methylamino-4-fluorotriazinyl-6, 2-ethylamino- or 2-propylamino-4-fluorotriazinyl-6, 2-β-hydroxyethylamino-4-fluorotriazinyl-6, 2-di-β-hydroxyethylamino-4-fluorotriazinyl-6 and the corresponding sulphuric acid half-esters, 2-diethylamino-4-fluorotriazinyl-6, 2-morpholino- or 2-piperidino-4-fluorotriazinyl-6, 2-cyclohexylamino-4-fluorotriazinyl-6, 2-arylamino- and substituted arylamino-4-fluorotriazinyl-6, such as 2-phenylamino-4-fluorotriazinyl-6, 2-(o-, m- or p-carboxyphenyl or sulphophenyl)-amino-4-fluorotriazinyl-6, 2-alkoxy-4-fluorotriazinyl-6, such as 2-methoxy- or ethoxy-4-fluorotriazinyl-6, 2-(phenylsulphonylmethoxy)-4-fluorotriazinyl-6, 2-aryloxy- and substituted aryloxy-4-fluorotriazinyl-6, such as 2-phenoxy-4-fluorotriazinyl-6, 2-(p-sulphophenyl)-oxy-4-fluorotriazinyl-6, 2-(o-, m- or p-methylphenyl or methoxyphenyl)-oxy-4-fluorotriazinyl-6, 2-alkylmercapto- or 2-arylmercapto- or 2-(substituted aryl)-mercapto-4-fluorotriazinyl-6, such as 2-β-hydroxyethylmercapto-4-fluorotriazinyl-6, 2-phenylmercapto-4-fluorotriazinyl-6, 2-(4'-methylphenyl)-mercapto-4-fluorotriazinyl-6 and 2-(2',4'-dinitro)-phenylmercapto-4-fluorotriazinyl-6, 2-methyl-4-fluorotriazinyl-6 and 2-phenyl-4-fluorotriazinyl-6, mono-, di- or tri-halogenopyrimidinyl radicals, such as 2,4-dichloropyrimidinyl-6, 2,4,5-trichloropyrimidinyl-6, 2,4-dichloro-5-nitro- or -5-methyl- or -5-carboxymethyl- or -5-carboxy- or -5-cyano- or -5-vinyl- or -5-sulpho- or -5-mono-, -di- or -tri-chloromethyl- or -5-carboalkoxypyrimidinyl-6, 2,6-dichloropyrimidine-4-carbonyl, 2,4-dichloropyrimidine-5-carbonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulphonyl, 2-chloroquinoxaline-3-carbonyl, 2- or 3-monochloroquinoxaline-6-carbonyl, 2- or 3-monochloroquinoxaline-6-sulphonyl, 2,3-dichloroquinoxaline-6-carbonyl, 2,3-dichloroquinoxaline-6-sulphonyl, 1,4-dichlorophthalazine-6-sulphonyl or -6-carbonyl, 2,4-dichloroquinazoline-7- or -6-sulphonyl or -carbonyl, 2- or 3- or 4-(4',5'-dichloropyridaz-6'-on-1'-yl)-phenylsulphonyl or -carbonyl, β-(4',5'-dichloropyridaz-6'-on-1'-yl)-ethylcarbonyl, N-methyl-N-(2,4-dichlorotriazinyl-6-(-carbamyl, N-methyl-N-(2-methylamino-4-chlorotriazinyl-6)-carbamyl, N-methyl-N-(2-dimethylamino-4-chlorotriazinyl-6)-carbamyl, N-methyl- or N-ethyl-N-(2,4-dichlorotriazinyl-6-)-aminoacetyl, N-methyl-N-(2,3-dichloroquinoxaline-6-sulphonyl)-aminoacetyl, N-methyl-N-(2,3-dichloroquinoxaline-6-carbonyl)-aminoacetyl, and the corresponding bromine and fluorine derivatives of the abovementioned chlorine-substituted heterocyclic radicals, including, for example, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulphonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulphonyl-4-pyrimidinyl, 2-fluoro-5-sulphonamido-4-pyrimidinyl, 2-fluoro-5-chloro-6-carbomethoxy-4-pyrimidinyl and 2,6-difluoro-5-trifluoromethyl-4-pyrimidinyl; triazine radicals containing sulphonyl groups, such as 2,4-bis-(phenylsulphonyl)-triazinyl-6, 2-(3'-carboxyphenyl)-sulphonyl-4-chlorotriazinyl-6, 2-(3'-sulphophenyl)-sulphonyl-4-chlorotriazinyl-6 and 2,4-bis-(3'-carboxyphenylsulphonyl-)-triazinyl-6; pyrimidine rings containing sulphonyl groups, such as 2-carboxymethylsulphonyl-pyrimidinyl-4, 2-methylsulphonyl-6-methyl-pyrimidinyl-4, 2-methylsulphonyl-6-ethyl-pyrimidinyl-4, 2-phenylsulphonyl-5-chloro-6-methyl-pyrimidinyl-4, 2,6-bis-methylsulphonyl-pyrimidinyl-4, 2,6-bis-methylsulphonyl-5-chloro-pyrimidinyl-4, 2,4-bis-methylsulphonyl-pyrimidine-5-sulphonyl, 2-methylsulphonyl-pyrimidinyl-4, 2-phenylsulphonyl-pyrimidinyl-4, 2-trichloromethylsulphonyl-6-methyl-pyrimidinyl-4, 2-methylsulphonyl-5-chloro-6-methyl-pyrimidinyl-4, 2-methylsulphonyl-5-bromo-6-methyl-pyrimidinyl-4, 2-methylsulphonyl-5-chloro-6-ethylpyrimidinyl-4, 2-methylsulphonyl-5-chloro-6-chloromethyl-pyrimidinyl-4, 2-methylsulphonyl-4-chloro-6-methyl-pyrimidinyl-5-sulphonyl, 2-methylsulphonyl-5-nitro-6-methyl-pyrimidinyl-4, 2,5,6-tris-methylsulphonyl-pyrimidinyl-4, 2-methylsulphonyl-5,6-dimethyl-pyrimidinyl-4, 2-ethylsulphonyl-5-chloro-6-methyl-pyrimidinyl-4, 2-methylsulphonyl-6-chloro-pyrimidinyl-4, 2,6-bis-methylsulphonyl-5-chloro-pyrimidinyl-4, 2-methylsulphonyl-6-carboxy-pyrimidinyl-4, 2-methylsulphonyl-5-sulpho-pyrimidinyl-4, 2-methylsulphonyl-6-carbomethoxy-pyrimidinyl-4, 2-methylsulphonyl-5-carboxy-pyrimidinyl-4, 2-methylsulphonyl-5-cyano-6-methoxy-pyrimidinyl-4, 2-methylsulphonyl-5-chloro-pyrimidinyl-4, 2-sulphoethylsulphonyl-6-methyl-pyrimidinyl-4, 2-methylsulphonyl-5-bromo-pyrimidinyl-4, 2-phenylsulphonyl-5-chloro-pyrimidinyl-4, 2-carboxymethylsulphonyl-5-chloro-6-methyl-pyrimidinyl-4, 2-methylsulphonyl-6-chloropyrimidine-4- and -5-carbonyl, 2,6-bis-(methylsulphonyl)-pyrimidine-4- or -5-carbonyl, 2-ethylsulphonyl-6-chloropyrimidine-5-carbonyl, 2,4-bis-(methylsulphonyl)-pyrimidine-5-sulphonyl and 2-methylsulphonyl-4-chloro-6-methylpyrimidine-5-sulphonyl or -carbonyl; triazine rings containing ammonium groups, such as 2-trimethylammonium-4-phenylamino- or -4-(o-, m- or p-sulphophenyl)-aminotriazinyl-6, 2-(1,1-dimethylhydrazinium)-4-phenylamino- or -4-(o-, m- or p-sulphophenyl)-aminotriazinyl-6, 2-(2-isopropylidene-1,1-dimethyl)-hydrazinium-4-phenylamino- or -4-(o-, m- or p-sulphophenyl)-aminotriazinyl-6, 2-N-aminopyrrolidinium- or 2-N-aminopiperidinium-4-phenylamino- or -4-(o-, m- or p-sulphophenyl)-aminotriazinyl-6 as well as 4-phenylamino- or 4-(sulphophenylamino)-triazinyl-6 radicals which contain 1,4-bis-aza-bicyclo-[2,2,2]-octane or 1,2-bis-aza-bicyclo-[0,3,3]-octane bonded via a nitrogen bond, as a quaternary structure, in the 2-position, 2-pyridinium-4-phenylamino- or -4-(o-, m- or p-sulphophenyl)-amino-triazinyl-6 and the corresponding 2-oniumtriazinyl-6 radicals which are substituted in the 4-position by alkylamino, such as methylamino, ethylamino or β-hydroxyethylamino, or alkoxy, such as methoxy or alkoxy, or aroxy, such as phenoxy or sulphophenoxy, groups; 2-chlorobenzthiazole-5- or -6-carbonyl or -5- or -6-sulphonyl, 2-arylsulphonyl- or -alkylsulphonyl-benzthiazol-5-1 or -6-carbonyl or -5- or -6-sulphonyl, such as 2-methylsulphonyl- or 2-ethylsulphonyl-benzthiazole-5- or -6-sulphonyl or -carbonyl, 2-phenylsulphonyl-benzthiazole-5- or -6-sulphonyl or -carbonyl and the corresponding 2-sulphonylbenzthiazole-5- or -6-carbonyl or -sulphonyl derivatives which contain sulpho groups in the fused benzene ring, 2-chlorobenzoxazole-5- or -6-carbonyl or -sulphonyl, 2-chlorobenzimidazole-5- or -6-carbonyl or -sulphonyl, 2-chloro-1-methylbenzimidazole-5- or -6-carbonyl or -sulphonyl, 2-chloro-4-methyl-1,3-thiazole-5-carbonyl or -4- or -5-sulphonyl and the N-oxide of 4-chloro- or 4-nitro-quinoline-5-carbonyl.

In addition, reactive groups of the aliphatic series should be mentioned, such as acryloyl, mono-, di- or trichloroacryloyl, such as —CO—CH=CH—Cl and —CO—CCl=CH₂, —CO—CCl=CH—CH₃ as well as —CO—CCl=CH—COOH and —CO—CH=C-Cl—COOH, β—chloropropionyl, 3-phenylsulphonylpropionyl, 3-methylsulphonylpropionyl, β-sulphatoethylaminosulphonyl, vinylsulphonyl, β-chloroethylsulphonyl, β-sulphatoethylsulphonyl, β-methylsulphonyl-ethylsulphonyl, β-phenylsulphonethylsulphonyl, 2-fluoro-2-chloro-3,3-difluorocyclobutane-1-carbonyl, 2,2,3,3-tetrafluorocyclobutane-carbonyl-1 or -sulphonyl-1, β-(2,2,3,3-tetrafluorocyclobutyl-1)-acryloyl, α- or β-bromoacryloyl and an α- or β-alkyl- or aryl-sulphonyl-acryloyl group, such as α- or β-methylsulphonylacryloyl.

Preferred dyestuffs correspond to the formulae

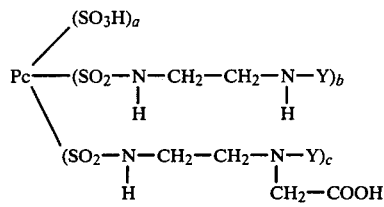

III wherein Pc, Y, a, b and c have the stated meaning,

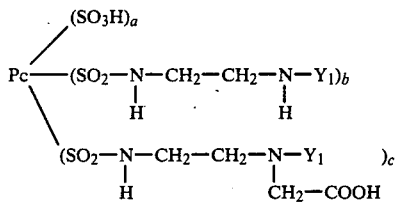

IV wherein
Pc, a, b and c have the stated meaning and
Y₁ represents the 2,4-dichloro-triazinyl-6 radical, and

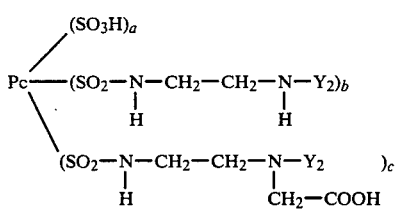

V wherein Pc, a, b and c have the stated meaning and Y₂ represents a monofluorotriazinyl-6 radical, such as, for example, 2,4-difluorotriazinyl-6, 2-amino-4-fluorotriazinyl-6, 2-alkylamino-4-fluorotriazinyl-6, such as 2-methylamino-4-fluorotriazinyl-6, 2-ethylamino- or 2-propylamino-4-fluorotriazinyl-6, 2-β-hydroxyethylamino-4-fluorotriazinyl-6, 2-di-β-hydroxyethylamino-4-fluorotriazinyl-6 and the corresponding sulphuric acid half-esters, 2-diethylamino-4-fluorotriazinyl-6, 2-morpholino- or 2-piperidino-4-fluorotriazinyl-6, 2-cyclohexylamino-4-fluorotriazinyl-6, 2-arylamino- and substituted arylamino-4-fluorotriazinyl-6, such as 2-phenylamino-4-fluorotriazinyl-6, 2-(o-, m- or p-carboxyphenyl or -sulphophenyl)-amino-4-fluorotriazinyl-6-, 2-alkoxy-4-fluorotriazinyl-6, such as 2-methoxy- or -ethoxy-4-fluorotriazinyl-6, 2-(phenylsulphonylmethoxy)-4-fluorotriazinyl-6, 2-aryloxy- and substituted aryloxy-4-fluorotriazinyl-6, such as 2-phenoxy-4-fluorotriazinyl-6, 2-(p-sulphophenyl)-oxy-4-fluorotriazinyl-6, 2-(o-, m- or p-methylphenyl or -methoxyphenyl)-oxy-4-fluorotriazinyl-6, and 2-alkylmercapto- or 2-arylmercapto- or 2-(substituted aryl)-mercapto-4-fluorotriazinyl-6, such as 2-β-hydroxyethyl-mercapto-4-fluorotriazinyl-6, 2-phenylmercapto-4-fluorotriazinyl-6, 2-(4'-methylphenyl)mercapto-4-fluorotriazinyl-6, 2-(2',4'-dinitro)phenylmercapto-4-fluorotriazinyl-6, 2-methyl-4-fluorotriazinyl-6 and 2-phenyl-4-fluorotriazinyl-6,

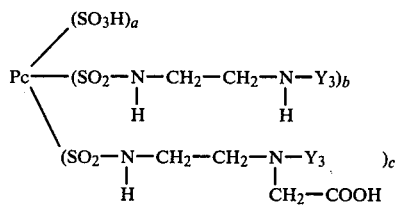

VI wherein Pc, a, b and c have the stated meaning and Y₃ represents a mono-, di- or tri-halogenopyrimidinyl radical, such as, for example, 2,4,5-trichloropyrimidinyl-6, 2,4-dichloro-pyrimidinyl-6, 2,4-difluoro-5-chloropyrimidinyl-6, 2-fluoro-5-chloro-6-methyl-pyrimidinyl-4, 2-fluoro-4-chloro-pyrimidinyl-6 or 2-fluoro-5,6-dichloropyrimidinyl-4, and

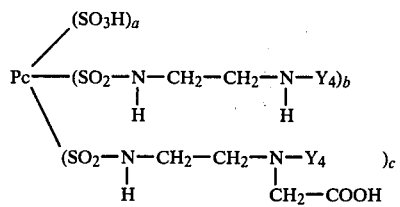

VII wherein Pc, a, b and c have the stated meaning and Y₄ represents a monochlorotriazinyl-6 radical, such as, for example, the 2-amino-4-chlorotriazinyl-6, 2-alkylamino-4-chlorotriazinyl-6, such as 2-methylamino-4-chlorotriazinyl-6, 2-ethylamino- or 2-propylamino-4-chlorotriazinyl-6, 2-β-hydroxyethylamino-4-chlorotriazinyl-6 and 2-di-β-hydroxyethylamino-4-chlorotriazinyl-6 and the corresponding sulphuric acid half-esters, 2-diethylamino-4-chlorotriazinyl-6, 2-morpholino- or 2-piperidino-4-chlorotriazinyl-6, 2-cyclohexylamino-4-chlorotriazinyl-6, 2-arylamino- and substituted arylamino-4-chlorotriazinyl-6, such as 2-phenylamino-4-chlorotriazin-yl-6, 2-(o-, m- or p-carboxyphenyl or sulphophenyl)amino-4-chlorotriazinyl-6, 2-alkoxy-4-chlorotriazin-yl-6, such as 2-methoxy- or -ethoxy-4-chlorotriazin-yl-6, 2-(phenylsulphonylmethoxy)-4-chlorotriazinyl-6, 2-aryloxy- and substituted aryloxy-4-chlorotriazinyl-6, such as 2-phenoxy-4-chlorotriazinyl-6, 2-(p-sulphophenyl)-oxy-4-chlorotriazinyl-6, 2-(o-, m- or p-methylphenyl or methoxyphenyl)-oxy-4-chlorotriazinyl-6, 2-alkylmercapto- or 2-arylmercapto- or 2-(substituted aryl)-mercapto-4-chlorotriazinyl-6, such as 2-β-hydroxyethyl-mercapto-4-chlorotriazinyl-6, 2-phenylmercapto-4-chlorotriazinyl-6, 2-(4'-methylphenyl)-mercapto-4-chlorotriazinyl-6 and 2-(2',4'-dinitro)-phenylmercapto-4-chlorotriazinyl-6-, and 2-methyl-4-chlorotriazinyl-6 and 2-phenyl-4-chlorotriazinyl-6 radical.

The reactive groups Y and Y₁–Y₄ can be identical or different.

The preparation of compounds of the formula I is carried out, for example, by acylating compounds of the formula VIII

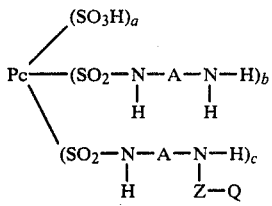

$$\text{VIII}$$

wherein Pc, A, Z, Q, a, b and c have the stated meaning with (b+c) mol of an acylating agent of the formula IX

L—Y            IX wherein

Y has the stated meaning and

L represents a group which can be split off as an anion.

Examples of reactive components of the formula IX suitable for this purpose are those on which the above-mentioned reactive groups are based, that is to say, in general, the halides, especially the chlorides, of the stated acyl components Y. Amongst the large number of available compounds, the following may be mentioned here by way of a selection: trihalogeno-symmetrical triazines, such as cyanuric chloride and cyanuric fluoride, dihalogenomonoamino- and monosubstituted amino-symmetrical triazines, such as 2,6-dichloro-4-aminotriazine, 2,6-dichloro-4-methylaminotriazine, 2,6-dichloro-4-ethylaminotriazine, 2,6-dichloro-4-hydroxyethylaminotriazine, 2,6-dichloro-4-phenylaminotriazine, 2,6-dichloro-4-(o-, m- or p-sulphophenyl)aminotriazine, 2,6-dichloro-4-(2′,3′-, 2′,4′-, 3′,4′- or 3′,5′-disulphophenyl)-aminotriazine, 2,6-dichloro-4-(2′-methyl-4′-sulphophenyl)-aminotriazine, 2,6-dichloro-(2′-chloro-4′-sulphophenyl)-aminotriazine, 2,6-dichloro-(2′-methyl-5′-sulphophenyl)-aminotriazine, 2,6-dichloro-(2′-methoxy-5′-sulphophenyl)-aminotriazine, 2,6-dichloro-(2′,5′-disulpho-4′-methoxyphenyl)-aminotriazine and 2,6-dichloro-(4′,8′-disulphonaphth-2′-yl)-aminotriazine, dichloro-alkoxy- and -aryloxy-sym. triazines, such as 2,6-dichloro-4-methoxytriazine, 2,6-dichloro-4-ethoxytriazine, 2,6-dichloro-4-phenoxytriazine and 2,6-dichloro-4-(o-, m- or p-sulphophenyl)-oxytriazine, dichloro-alkylmercapto- and -arylmercapto-sym. triazines, such as 2,6-dichloro-4-ethylmercapto-triazine, 2,6-dichloro-4-phenylmercapto-triazine and 2,6-dichloro-4-(p-methylphenyl)-mercaptotriazine, 2,6-dichloro-4-methoxyethoxy-triazine, 2,6-difluoro-4-aminotriazine, 2,6-difluoro-4-methylaminotriazine, 2,6-difluoro-4-ethylaminotriazine, 2,6-difluorohydroxyethylaminotriazine, 2,6-difluoro-4-phenylamino-triazine, 2,6-difluoro-4-(o-, m- or p-sulphophenyl)-aminotriazine, 2,6-difluoro-4-(2′,3′-, -2′,4′-, -3′,4′- or -3′,5′-disulphophenyl)-aminotriazine, 2,6-difluoro-4-(2′-methyl-4′-sulphophenyl)-aminotriazine, 2,6-difluoro-(2′-chloro-4′-sulphophenyl)-aminotriazine, 2,6-difluoro-(2′-methyl-5′-sulphophenyl)-aminotriazine, 2,6-difluoro-(2′-methoxy-5′-sulphophenyl)-aminotriazine, 2,6-difluoro-(2′,5′-disulpho-4′-methoxyphenyl)-aminotriazine, 2,6-difluoro-(4′,8′-disulphonaphth-2′-yl)-aminotriazine, difluoro-alkoxy- and -aryloxy-sym.-triazines, such as 2,6-difluoro-4-methoxytriazine, 2,6-difluoro-4-ethoxytriazine, 2,6-difluoro-4-phenoxytriazine and 2,6-difluoro-4-(o-, m- or p-sulphophenyl)-oxytriazine, and difluoroalkylmercapto- and -arylmercapto-sym. triazines, such as 2,6-difluoro-4-ethylmercapto-triazine, 2,6-difluoro-4-phenylmercaptotriazine, 2,6-difluoro-4-(p-methylphenyl)-mercaptotriazine and 2,6-difluoro-4-methoxythoxytriazine.

Tetrahalogeno-pyrimidines, such as tetrachloro-, tetrabromo- or tetrafluoro-pyrimidine, 2,4,6-trihalogenopyrimidines, such as 2,4,6-trichloro-, -tribromo- or -trifluoro-pyrimidine and dihalogenopyrimidines, such as 2,4-dichloro-, -dibromo- or -difluoropyrimidines; 2,4,6-trichloro-5-nitro- or -5-methyl- or -5-carbomethoxy- or -5-carboethoxy- or -5-carboxymethyl- or -5-mono-, -di- or -tri-chloromethyl- or -5-carboxy- or -5-sulpho- or -5-cyano- or -5-vinyl-pyrimidine, 2,4-difluoro-6-methylpyrimidine, 2,6-difluoro-4-methyl-5-chloropyrimidine, 2,4-difluoro-pyrimidine-5-ethylsulphone, 2,6-difluoro-4-chloropyrimidine, 2,4,6-trifluoro-5-chloropyrimidine, 2,6-difluoro-4-methyl-5-bromopyrimidine, 2,4-difluoro-5,6-dichloro- or -dibromopyrimidine, 4,6-difluoro-2,5-dichloro- or -dibromo-pyrimidine, 2,6-difluoro-4-bromopyrimidine, 2,4,6-trifluoro-5-bromopyrimidine, 2,4,6-trifluoro-5-chloromethylpyrimidine, 2,4,6-trifluoro-5-nitropyrimidine, 2,4,6-trifluoro-5-cyanopyrimidine, 2,4,6-trifluoropyrimidine-5-carboxylic acid alkyl esters or -5-carboxylic acid amides, 2,6-difluoro-5-methyl-4-chloropyrimidine, 2,6-difluoro-5-chloropyrimidine, 2,4,6-trifluoro-5-methylpyrimidine, 2,4,5-trifluoro-6-methylpyrimidine, 2,4-difluoro-5-nitro-6-chloropyrimidine, 2,4-difluoro-5-cyanopyrimidine, 2,4-difluoro-5-methylpyrimidine, 6-trifluoromethyl-5-chloro-2,4-difluoropyrimidine, 6-phenyl-2,4-difluoropyrimidine, 6-trifluoromethyl-2,4-difluoropyrimidine, 5-trifluoromethyl-2,4,6-trifluoropyrimidine, 2,4-difluoro-5-nitro-pyrimidine, 2,4-difluoro-5-trifluoromethylpyrimidine, 2,4-difluoro-5-methylsulphonylpyrimidine, 2,4-difluoro-5-phenyl-pyrimidine, 2,4-difluoro-5-carboxamido-pyrimidine, 2,4-difluoro-5-carbomethoxypyrimidine, 2,4-difluoro-6-trifluoromethylpyrimidine, 2,4-difluoro-5-bromo-6-trifluoromethyl-pyrimidine, 2,4-difluoro-6-carboxamido-pyrimidine, 2,4-difluoro-6-carbomethoxypyrimidine, 2,4-difluoro-6-phenylpyrimidine, 2,4-difluoro-6-cyano-pyrimidine, 2,4,6-trifluoro-5-methylsulphonyl-pyrimidine, 2,4-difluoro-5-sulphonamido-pyrimidine, 2,4-difluoro-5-chloro-6-carbomethoxy-pyrimidine, 5-trifluoromethyl-2,4-difluoropyrimidine, 2,4-dichloropyrimidine-5-carboxylic acid chloride, 2,4,6-trichloropyrimidine-5-carboxylic acid chloride, 2-methyl-4-chloropyrimidine-5-carboxylic acid chloride, 2-chloro-4-methylpyrimidine-5-carboxylic acid chloride and 2,6-dichloropyrimidine-4-carboxylic acid chloride; pyrimidine reactive components with removable sulphonyl groups, such as 2-carboxymethylsulphonyl-4-chloropyrimidine, 2-methylsulphonyl-4-chloro-6-methylpyrimidine, 2,4-bis-methylsulphonyl-6-methylpyrimidine, 2,4-bis-phenylsulphonyl-5-chloro-6-methylpyrimidine, 2,4,6-tris-methylsulphonylpyrimidine, 2,6-bis-methylsulphonyl-4,5-dichloropyrimidine, 2,4-bis-methylsulphonylpyrimidine-5-sulphonic acid chloride, 2-methylsulphonyl-4-chloropyrimidine, 2-phenylsulphonyl-4-chloropyrimidine, 2,4-bis-trichloromethylsulphonyl-6-methylpyrimidine, 2,4-bis-methylsulphonyl-5-chloro-6-methylpyrimidine, 2,4-bis-methylsulphonyl-5-bromo-6-methylpyrimidine, 2-methylsulphonyl-4,5-dichloro-6-methylpyrimidine, 2-methylsulphonyl-4,5-dichloro-6-chloromethylpyrimidine, 2-methylsulphonyl-4-chloro-6-methylpyrimidine-5-sulphonic acid chloride, 2-methylsulphonyl-4-chloro-5-nitro-6-methylpyrimidine, 2,4,5,6-tetramethylsulphonyl-pyrimidine, 2-methylsulphonyl-4-chloro-5,6-dimethylpyrimidine, 2-ethylsulphonyl-4,5-dichloro-6-methylpyrimidine, 2-methylsulphonyl-4,6-dichloropyrimidine, 2,4,6-tris-methylsulphonyl-5-chloropyrimidine, 2-methylsulphonyl-4-chloro-6-carboxypyrimidine, 2-methylsulphonyl-4-chloropyrimidine-5-sulphonic acid, 2-methylsulphonyl-4-chloro-6-carbomethoxypyrimidine, 2-methylsulphonyl-4-chloro-pyrimidine-5-carboxylic acid, 2-methylsulphonyl-4-chloro-5-cyano-6-methoxypyrimidine, 2-methylsulphonyl-4,5-dichloropyrimidine, 4,6-bis-methylsulphonylpyrimidine, 4-methylsulphonyl-6-chloropyrimidine, 2-sulphoethylsulphonyl-4-chloro-6-methylpyrimidine, 2-methylsulphonyl-4-chloro-5-bromopyrimidine, 2-methylsulphonyl-4-chloro-5-bromo-6-methylpyrimidine, 2,4-bis-methylsulphonyl-5-chloropyrimidine, 2-phenylsulphonyl-4,5-dichloropyrimidine, 2-phenylsulphonyl-4,5-dichloro-6-methylpyrimidine, 2-carboxymethylsulphonyl-4,5-dichloro-6-methylpyrimidine, 2-(2'- or 3'- or 4'-carboxyphenylsulphonyl)-4,5-dichloro-6-methylpyrimidine, 2,4-bis-(2'- or 3'- or 4'-carboxyphenylsulphonyl)-5-chloro-6-methylpyrimidine, 2-methylsulphonyl-6-chloropyrimidine-4- or -5-carboxylic acid chloride, 2-ethylsulphonyl-6-chloropyrimidine-4- or -5-carboxylic acid chloride, 2,6-bis-(methylsulphonyl)-pyrimidine-4-carboxylic acid chloride, 2-methylsulphonyl-6-methyl-4-chloro- or -4-bromo-pyrimidine-5-carboxylic acid chloride or bromide and 2,6-bis-(methylsulphonyl)-4-chloropyrimidine-5-carboxylic acid chloride; examples of further reactive components of the heterocyclic series, having reactive sulphonyl substituents, are 3,6-bis-phenylsulphonyl-pyridazine, 3-methylsulphonyl-6-chloropyridazine, 3,6-bis-trichloromethylsulphonyl-pyridazine, 3,6-bis-methylsulphonyl-4-methylpyridazine, 2,5,6-tris-methylsulphonylpyrazine, 2,4-bis-methylsulphonyl-1,3,5-triazine, 2,4-bis-methylsulphonyl-6-(3'-sulphophenylamino)-1,3,5-triazine, 2,4-bis-methylsulphonyl-6-N-methylanilino-1,3,5-triazine, 2,4-bis-methylsulphonyl-6-phenoxy-1,3,5-triazine, 2,4-bis-methylsulphonyl-6-trichloroethoxy-1,3,5-triazine, 2,4-tris-phenylsulphonyl-1,3,5-triazine, 2,4-bis-methylsulphonylquinazoline, 2,4-bis-trichloromethylsulphonylquinoline, 2,4-bis-carboxymethylsulphonylquinoline, 2,6-bis-(methylsulphonyl)-pyridine-4-carboxylic acid chloride and 1-(4'-chlorocarbonylphenyl or 2'-chlorocarbonyl ethyl)-4,5-bis-methylsulphonylpyridaz-6-one; further heterocyclic reactive components possessing mobile halogen are, inter alia, 2- or 3-monochloroquinoxaline-6-carboxylic acid chloride or -6-sulphonic acid chloride, 2- or 3-monobromoquinoxaline-6-carboxylic acid bromide or -6-sulphonic acid bromide, 2,3-dichloroquinoxaline-6-carboxylic acid chloride or -6-sulphonic acid chloride, 2,3-dibromoquinoxaline-6-carboxylic acid bromide or -6-sulphonic acid bromide, 1,4-dichlorophthalazine-6-carboxylic acid chloride or -6-sulphonic acid chloride and the corresponding bromine compounds, 2,4-dichloroquinazoline-6- or -7-carboxylic acid chloride or -7-sulphonic acid chloride and the corresponding bromine compounds, 2- or 3- or 4-(4',5'-dichloropyridaz-6'-on-1'-yl)-phenylsulphonic acid chloride or -carboxylic acid chloride and the corresponding bromine compounds, β-(4',5'-dichloropyridaz-6'-on-1'-yl)-ethylcarboxylic acid chloride, 2-chloroquinoxaline-3-carboxylic acid chloride and the corresponding bromine compounds, N-methyl-N-(2,4-dichlorotriazin-6-yl)-carbamic acid chloride, N-methyl-N-(2-chloro-4-methylamino-triazin-6-yl)-carbamic acid chloride, N-methyl-N-(2-chloro-4-dimethylamino-triazin-6-yl)-carbamic acid chloride, N-methyl- or N-ethyl-N-(2,4-dichlorotriazin-6-yl)-aminoacetyl chloride, N-methyl-, N-ethyl- or N-hydroxyethyl-N-(2,3-dichloroquinoxaline-6-sulphonyl or -6-carbonyl)-aminoacetyl chloride and the corresponding bromine derivatives, and also 2-chlorobenzthiazole-5- or -6-carboxylic acid chloride or -5- or -6-sulphonic acid chloride and the corresponding bromine compounds, 2-arylsulphonyl- or 2-alkylsulphonyl-benzthiazole-5- or -6-carboxylic acid chloride or -5- or -6-sulphonic acid chloride, such as 2-methylsulphonyl- or 2-ethylsulphonyl- or 2-phenylsulphonyl-benzthiazole-5- or -6-sulphonic acid chloride or -5- or -6-carboxylic acid chloride, and the corresponding 2-sulphonylbenzthiazole derivatives which contain sulphonic acid groups in the fused benzene ring, 3,4-bis-methylsulphonyl-isothiazole-4-carboxylic acid chloride, 2-chloro-benzoxazole-5- or -6-carboxylic acid chloride or -sulphonic acid chloride and the corresponding bromine derivatives, 2-chlorobenzimidazole-5- or -6-carboxylic acid chloride or -sulphonic acid chloride and the corresponding bromine derivatives, 2-chloro-1-methylbenzimidazole-5- or -6-carboxylic acid chloride or -sulphonic acid chloride and the corresponding bromine derivatives, 2-chloro-4-methyl-1,3-thiazole-5-carboxylic acid chloride or -4- or -5-sulphonic acid chloride, 2-chloroethiazole-4- or -5-sulphonic acid chloride and the corresponding bromine derivatives.

The following may be mentioned as examples from the series of the aliphatic reactive components: acrylic acid chloride, mono- di- or tri-chloro-acrylic acid chloride, 3-chloropropionic acid chloride, 3-phenylsulphonylpropionic acid chloride, 3-methylsulphonyl-propionic acid chloride, 3-ethyl-sulphonylpropionic acid chloride, 3-chloroethanesulphochloride, chloromethanesulphochloride, 2-chloroacetyl chloride, 2,2,3,3-tetrafluorocyclobutane-1-carboxylic acid chloride, β-(2,2,3,3-tetrafluorocyclobutyl-1)-acrylic acid chloride, β-(2,2,3-trifluoro-2-chlorocyclobutane-1)-carboxylic acid chloride, β-methylsulphonyl-acrylic acid chloride, α-methylsulphonyl-acrylic acid chloride and α-bromoacrylic acid chloride and α-bromoacrylic acid chloride.

Compounds of the formula I which carry a monohalogeno-sym.-triazine radical as the fibre-reactive radical Y and are represented by the formula X

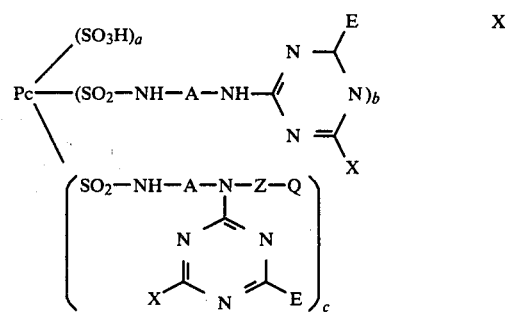

can also be prepared by replacing a radical X in dyestuffs of the formula XI

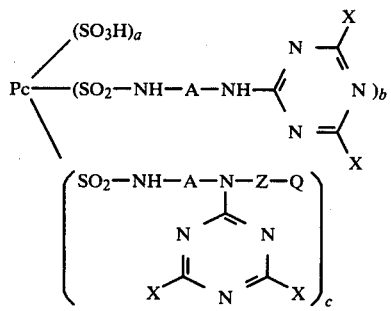

by the radical E in the known manner, by condensation with a compound H—E (XII).

In formulae X and XI,

Pc, A, Z, Q, a, b and c have the stated meaning,

E represents a substituent, especially $OR_2$, $SR_2$ or $NR_3R_4$, wherein $R_2$ denotes an optionally substituted alkyl, aryl or heteroaryl radical, $R_3$ represents hydrogen or an optionally substituted alkyl radical and $R_4$ represents hydrogen or an optionally substituted alkyl or aryl radical or $R_2$ and $R_3$, optionally with inclusion of a heteroatom, form a ring, and X denotes halogen, preferably Cl or F.

Examples of optionally substituted alkyl radicals $R_2$ are: methyl, ethyl, propyl, isopropyl, t-butyl, methoxymethyl, methoxyethyl and ethoxyethyl. Examples of optionally substituted aryl radicals $R_2$ are: phenyl, 4-chlorophenyl or 4-methoxyphenyl. Suitable alkyl radicals $R_3$ are the following: methyl, ethyl, propyl, isopropyl, n-butyl, cyclohexyl, hydroxyethyl, methoxyethyl, carboxymethyl, β-carboxyethyl and β-sulphoethyl. Suitable alkyl radicals $R_4$ are the following: methyl, ethyl, propyl, isopropyl, hydroxyethyl and methoxyethyl. Suitable aryl radicals $R_4$ are the following: phenyl, o-, m- and p-chlorophenyl, o-, m- and p-methoxyphenyl, o-, m- and p-methylphenyl, o-, m- and p-sulophphenyl, 2-methyl-4- or -5-sulphophenyl, 2-chloro-4- or -5-sulphophenyl, 2-methoxy-4- or -5-sulphophenyl, 2,5-disulophphenyl, 3,5-disulphophenyl, 2,5-disulpho-4-methoxyphenyl, 2-carboxyphenyl, 2-carboxy-4- or -5-sulphophenyl and 2-sulpho-4-methylphenyl. Suitable ring systems of the formula —$NR_2R_3$ are the radicals of pyrrolidine, piperidine or morpholine.

The replacement or a chlorine or fluorine atom in the formula XI by the radical E represents a condensation.

This condensation is carried out in accordance with methods which are in themselves known, advantageously in the presence of acid-binding agents, such as sodium acetate, sodium hydroxide or sodium carbonate, and under such conditions that a replaceable chlorine or fluorine atom still remains in the finished product, that is to say, for example, in the presence of organic solvents or at relatively low to moderately elevated temperatures in an aqueous medium. In this method of preparation, the following mercapto, hydroxyl and amino compounds of the formula XII are suitable reactants:

Aliphatic or aromatic mercapto or hydroxyl compounds, such as thioalcohols, thioglycollic acid, thiourea, thiophenols, mercaptobenzthiazoles, methyl, ethyl and isopropyl alcohol, glycollic acid, phenol, chlorophenols or nitrophenols, phenolcarboxylic acids and phenylsulphonic acids, naphthols and naphtholsulphonic acids, but especially ammonia and compounds which contain amino groups which can by acylated, such as hydroxylamine, hydrazine, phenylhydrazine, phenylhydrazinesulphonic acids, carbamic acid and its derivatives, semi- and thiosemi-carbazides and -carbazones, methylamine, ethylamine, isopropylamine, methoxyethylamine, methoxypropylamine, dimethylamine, diethylamine, methylphenylamine, ethylphenylamine, chloroethylamine, ethanolamines, propanolamines, benzylamine, cyclohexylamine, morpholine, piperidine, piperazine, aminocarbonic acid esters, ethyl aminoacetate, aminoethanesulphonic acid and N-methylaminoethanesulphonic acid, but above all aromatic amines, such as aniline, N-methylaniline, toluidines, xylidines, chloroanilines, p- and m-aminoacetanilide, nitroanilines, aminophenols, nitrotoluidines, phenylenediamines, toluylenediamines, anisidine, phenetidine, diphenylamine, naphthylamine, aminonaphthols, diaminonaphthalenes and, in particular, anilines containing acid groups, such as sulphanilic acid, metanilic acid, orthanilic acid, anilinedisulphonic acid and aminobenzoic acid, nphthylamine-monosulphonic acid, -disulphonic acid and -trisulphonic acid, aminobenzoic acids, such as 1-hydroxy-5-aminobenzoic acid, and aminonaphthol-mono-, -di- and -tri-sulphonic acids.

The invention further relates to compounds of the formula VIII

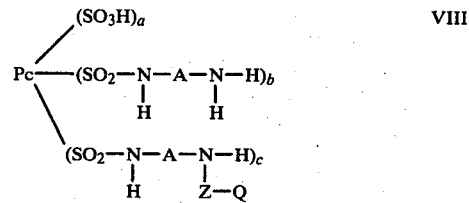

wherein Pc, A, Z, Q, a, b and c have the stated meaning.

Compounds of the formula VIII are obtained by alkylating the compounds of the formula XIII

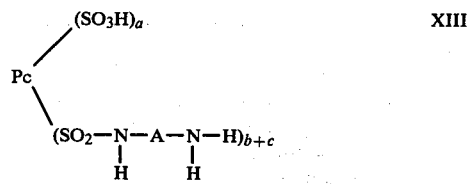

wherein Pc, A, a, b and c have the stated meaning, with c mols of alkylating agents of the formula XIV

wherein

Z and Q have the stated meaning and

L represents a group which can be split off as an anion.

The alkylation of the compunds of the formula XIII can be carried out in an aqueous, aqueous-organic or organic solvent, at temperatures between 0° and 140° C., preferably between 20° and 100° C., and in this reaction it is advantageous to neutralise or buffer the liberated acid by adding alkali, such as, for example, sodium bicarbonate, sodium carbonate, sodium hydroxide solution or sodium acetate. Suitable organic solvents are, above all, acetone, chlorohydrocarbons, such as ethylene chloride or chlorobenzene, or aprotic polar solvents, such as dimethylformamide.

Examples of alkylating agents of the formula XIV are chloroacetic acid, bromoacetic acid, 2-chloropropionic acid, 2-bromopropionic acid, 3-chloropropionic acid, 3-bromopropionic acid, 2-chlorobutyric acid, 2-bromobutyric acid, 3-chlorobutyric acid, 3-bromobutyric acid, 4-chlorobutyric acid, 4-bromobutyric acid, 2-methyl-3-chloropropionic acid, 2-methyl-3-bromopropionic acid, 2-chloroethanesulphonic acid, 2-bromoethanesulphonic acid, 4-chlorobutanesulphonic acid and 4-bromobutanesulphonic acid, as well as halogenoalkyldisulphimides of the formulae XV and XVI

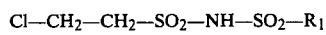

$$Cl-CH_2-CH_2-SO_2-NH-SO_2-R_1 \quad \text{XV}$$

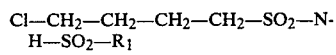

$$Cl-CH_2-CH_2-CH_2-CH_2-SO_2-N-H-SO_2-R_1 \quad \text{XVI}$$

wherein $R_1$ represents methyl, n-butyl, phenyl, tolyl or p-chlorophenyl.

Compounds of the formula VIII, with $Q=OSO_3H$, are obtained by alkylating XIII with alkylene oxides, such as ethylene oxide, and then converting the products to the sulphuric acid half-esters.

Phthalocyanine compounds of the formula XIII can themselves be produced by reacting a phthalocyanine-sulphochloride of the formula XVII

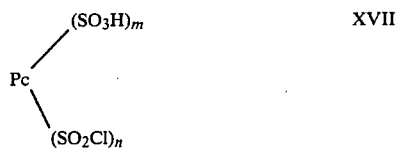

wherein
Pc has the stated meaning and
m represents a number from 0 to 3,
n represents a number from 1 to 4 and
the sum of m and n is at most 4,
in an aqueous medium, with a diamine of the formula XVIII

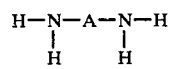

$$\begin{array}{c} H-N-A-N-H \\ | \quad\quad | \\ H \quad\quad H \end{array} \quad \text{XVIII}$$

wherein A has the abovementioned meaning.

Examples of diamines of the formula XVIII are ethylenediamine, propylenediamine, 1,4-diaminobutane, 1,6-diaminohexane and 1,4-diaminocyclohexane.

The phthalocyanine compounds of the formula XIII can furthermore be produced by reacting phthalocyanine-sulphochlorides of the formula XVII, in a manner which is in itself known, with mono-N-acetylated diamines of the formula XIX

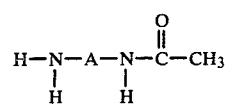

$$\begin{array}{c} \quad\quad\quad\quad O \\ \quad\quad\quad\quad || \\ H-N-A-N-C-CH_3 \\ | \quad\quad | \\ H \quad\quad H \end{array} \quad \text{XIX}$$

wherein A has the same meaning as in formula XVIII and subsequently removing the acetyl radical by hydrolysis under acid or alkaline conditions.

If the phthalocyanine-sulphonyl chloride of the formula XVII contains fewer sulphonic acid groups than are desired for the compound of the formula I, those sulphochloride groups which have not reacted with the diamine are hydrolysed to sulphonic acid groups.

Phthalocyaninesulphonic acid chlorides of the formula XVII can be obtained by treating the corresponding phthalocyanine or phthalocyaninesulphonic acid with chlorosulphonic acid, if necessary in the presence of carbon tetrachloride or of an acid halide, such as thionyl chloride, sulphuryl chloride, phosphorus pentachloride, phosphorus oxychloride and phosphorus trichloride, as described in British patent specifications Nos. 708,543, 784,834 and 785,629 and in U.S. Pat. No. 2,219,330.

The dyestuffs according to the invention can be single substances, that is to say the letters a, b and c represent integers. Preferably, however, the process of preparation results in mixtures which are characterized by non-integral numbers for a, b and c. These numbers are mean values. At times, such mixtures show particular advantages in respect of solubility and substantivity. In such mixtures, the numbers in the mean value vary.

Such mixtures according to the invention are prepared, for example, from two or more final dyestuffs of the formula I, each of which are single substances, or, particularly advantageously, by using a mixture of the starting components. The latter is often formed necessarily, since the phthalocyaninesulphonic acid chloride-sulphonic acids show differences in respect of the degree of sulphonation and in respect of their ratio of sulphonic acid chloride to sulphonic acid.

The new dyestuffs of the formula I are suitable for dyeing and printing materials containing hydroxyl groups or containing amide groups, such as textile fibres, yarns and fabrics consisting of wool, silk, synthetic polyamide and polyurethane fibres, and for the wash-fast dyeing and printing of natural or regenerated cellulose, the treatment of cellulose materials advantageously being carried out in the presence of acid-binding agents and, if necessary, with exposure to heat, in accordance with the processes which have been disclosed for reactive dyes.

The stated formulae of the dyestuffs are those of the corresponding free acids. The dyestuffs were in general isolated, and employed for dyeing, in the form of the alkali metal salts, especially the Na salts.

The amounts by weight mentioned in the examples relate to the free acid; the stated index numbers represent mean values.

EXAMPLES

Example 1

102.1 g of the dyestuff of the formula

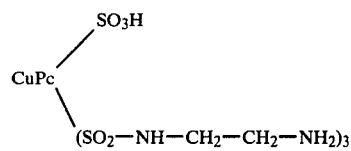

are suspended in 1,000 ml of $H_2O$ and the suspension is brought to pH 11 by adding sodium hydroxide solution. A solution of 14 g of bromoacetic acid in 100 ml of 1 N NaOH is added dropwise to the suspension. The pH of 11 is maintained and the mixture is warmed to 50° C.

and stirred for a further 6 hours at 50° C. After salting out with NaCl, the dyestuff of the formula

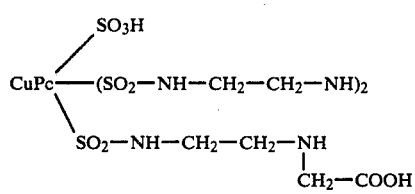

is obtained.

Example 2

If the description in Example 1 is followed but instead of 14 g of bromoacetic acid 28 g of bromoacetic acid are used, the dyestuff of the formula

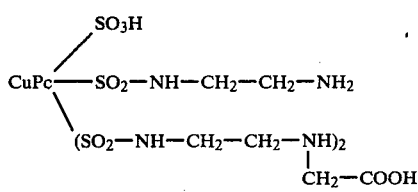

is obtained.

Example 3

If, following the description in Example 1, 97.9 g of the dyestuff of the formula

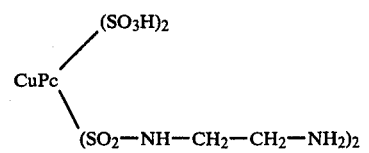

are reacted with 14 g of bromoacetic acid, the dyestuff of the formula

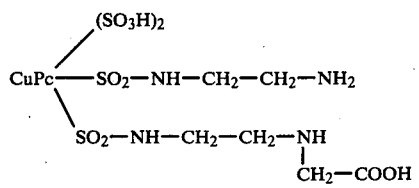

is obtained.

Example 4

If, following the description in Example, 1, 93.6 g of the dyestuff of the formula

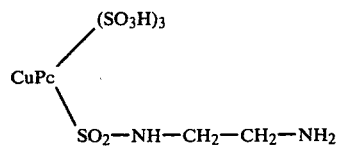

are reacted with 14 g of bromoacetic acid, the dyestuff of the formula

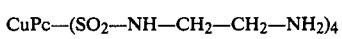

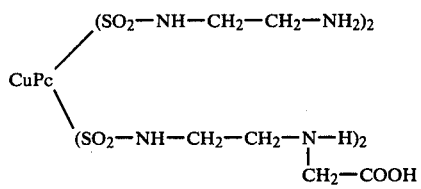

is obtained.

Example 5

If, following the description in Example 1, 105.9 g of the dyestuff of the formula $$CuPc-(SO_2-NH-CH_2-CH_2-NH_2)_4$$

are reacted with 28 g of bromoacetic acid, the dyestuff of the formula

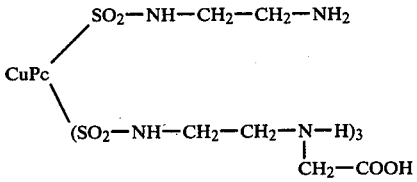

is obtained.

Example 6

If the description in Example 5 is followed, but instead of 28 g of bromoacetic acid 42 g of bromoacetic acid are used, the dyestuff of the formula

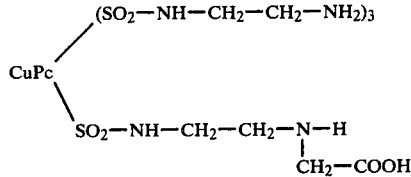

is obtained.

Example 7

If the description in Example 5 is followed, but instead of 28 g of bromoacetic acid 14 g of bromoacetic acid are used, the dyestuff of the formula

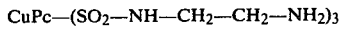

is obtained.

Example 8

If, following the description in Example 1, 93.7 g of the dyestuff of the formula $$CuPc-(SO_2-NH-CH_2-CH_2-NH_2)_3$$

are reacted with 28 g of bromoacetic acid, the dyestuff of the formula

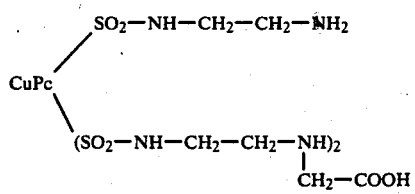

is obtained.

Example 9

If, following the description in Example 1, 89.6 g of the dyestuff of the formula

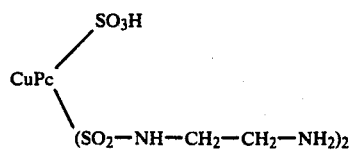

are reacted with 14 g of bromoacetic acid, the dyestuff of the formula

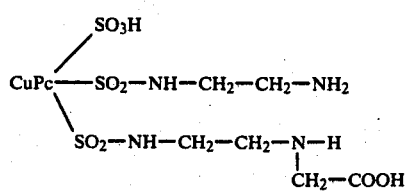

is obtained.

Example 10

The dyestuff end products of Examples 1-9 are also obtained if, in Examples 1-9, the bromoacetic acid is replaced by equivalent amounts of chloroacetic acid and the reaction is carried out at 70° C. instead of 50° C.

Example 11

101.8 g of the dyestuff of the formula

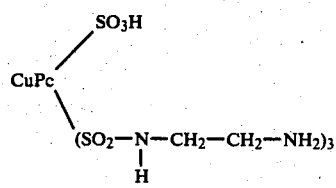

are suspended in 1,000 ml of $H_2O$ and the suspension is brought to pH 11 by adding sodium hydroxide solution. A solution of 21.7 g of 3-chloropropionic acid in 100 ml of 2 N NaOH is added dropwise to the suspension at 70° C. The pH of 11 is maintained and the mixture is stirred for a further 8 hours. After salting out with NaCl, the dyestuff of the formula

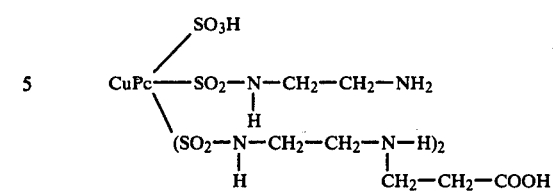

is obtained.

The same dyestuff is obtained if, in the above example, the equivalent amount of 3-bromopropionic acid is employed instead of 3-chloropropionic acid.

Example 12

If, following the description in Example 11, 105.9 g of the dyestuff of the formula

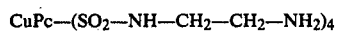

$$CuPc-(SO_2-NH-CH_2-CH_2-NH_2)_4$$

are reacted with 36.8 g of 2-methyl-3-chloropropionic acid, the dyestuff of the formula

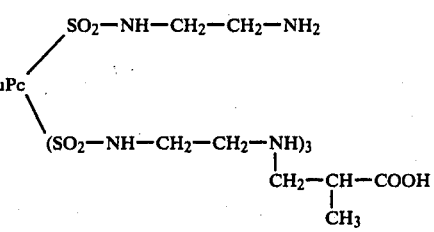

is obtained.

Example 13

If, following the description in Example 1, 110.2 g of the dyestuff of the formula

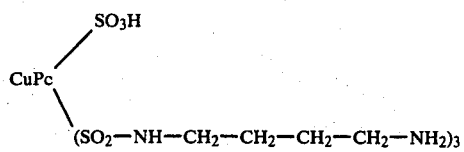

are reacted with 28 g of bromoacetic acid, the dyestuff of the formula

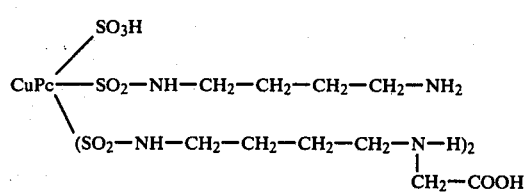

is obtained.

Example 14

101.8 g of the dyestuff of the formula

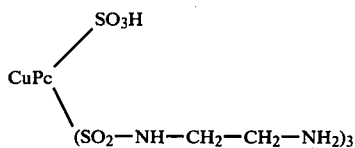

are suspended in 1,000 ml of H₂O and the pH is brought to 11 by adding sodium hydroxide solution. 28.9 g of 2-chloroethanesulphonic acid are added dropwise to the suspension and the mixture is warmed for 7 hours to 100° C., at pH 11. After salting out, the dyestuff of the formula

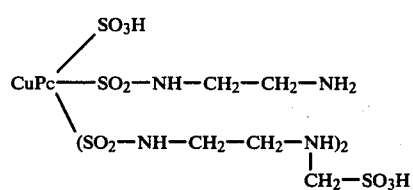

is obtained.

Example 15

If the description in Example 14 is followed, but instead of 2-chloroethanesulphonic acid an equivalent amount of 4-chlorobutanesulphonic acid is used, the dyestuff of the formula

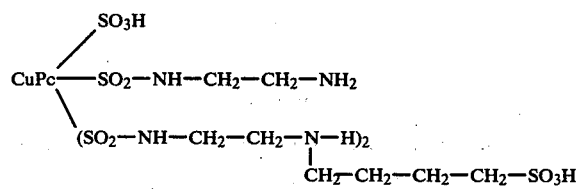

is obtained.

Example 16

If the description in Example 14 is followed, but instead of 2-chloroethanesulphonic acid an aquivalent amount of the disulphimide of the formula Cl—CH₂—CH₂—SO₂—NH—SO₂—CH₃ is used, the dyestuff of the formula

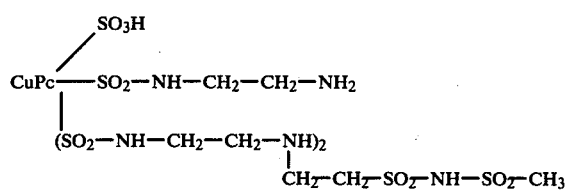

is obtained.

Example 17

101.7 g of the dyestuff of the formula

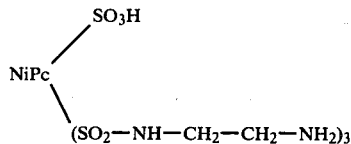

are suspended in 1,000 ml of H₂O and the pH is brought to 11 by adding sodium hydroxide solution. A solution of 28 g of bromoacetic acid in 100 ml of 2 N NaOH is added dropwise to the suspension. The pH of 11 is maintained and the mixture is warmed to 50° C. and stirred for a further 7 hours at 50° C. After salting out with NaCl, the dyestuff of the formula

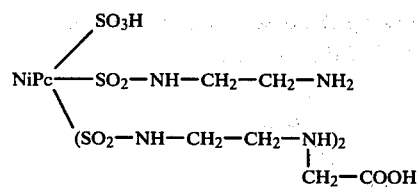

is obtained.

This dyestuff is also obtained if the procedure in Example 17 is followed but instead of bromoacetic acid equivalent amounts of chloroacetic acid are employed and the reaction is carried out at 70° C.

Example 18

107.9 g of the dyestuff prepared in Example 1 are suspended in 1,000 ml of H₂O. 49.5 g of 2,6-dichloro-4-amino-triazine are sprinkled into the suspension at 0° to 5° C. and the mixture is slowly warmed to 30° C. The pH is kept at between 6 and 7 by adding sodium hydroxide solution; the acylation is complete when no further sodium hydroxide solution is consumed. After salting out with NaCl, the reactive dyestuff of the formula

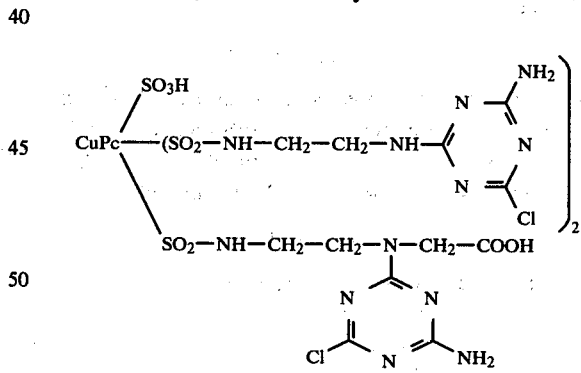

is isolated; this dyestuff dyes cotton, in accordance with one of the use examples listed, in a brilliant turquoise colour.

If the description in Example 18 is followed but instead of 2,6-dichloro-4-amino-triazine equivalent amounts of the reactive components shown below are used, valuable reactive dyestuffs are again obtained: cyanuric chloride, 2,6-dichloro-4-methylamino-triazine, 2,6-dichloro-4-ethylamino-triazine, 2,6-dichloro-4-hydroxyethylamino-triazine, 2,6-dichloro-4-phenylamino-triazine, 2,6-dichloro-4-(o-, m- or p-sulphophenyl)-amino-triazine, 2,6-dichloro-4-(2',3'-, 2',4'-, 3',4'- or 3',5'-disulphophenyl)-amino-triazine, 2,6-dichloro-4-(2'methyl-4'-sulphophenyl)-amino-triazine, 2,6-dichloro-(2'-chloro-4'-sulphophenyl)-amino-triazine, 2,6-dichloro-(2'-methyl-5'-sulphophenyl)-amino-triazine, 2,6-dichloro-(2'-methoxy-5'-sulphophenyl)-amino-triazine, 2,6-dichloro-(2',5'-disulpho-4'-methoxyphenyl)-amino-triazine, 2,6-dichloro-(4',8'-disulphonaphth-2'-yl)-amino-triazine, 2,6-dichloro-4-isopropoxy-triazine, 2,6-dichloro-4-methoxyethoxy-triazine, 2,6-dichloro-4-methoxy-triazine, 2,6-dichloro-4-ethoxy-triazine, 2,6-dichloro-4-phenoxytriazine, 2,6-dichloro-4-(o-, m- or p-sulphophenyl)-hydroxytriazine, 2,6-dichloro-4-ethylmercapto-triazine, 2,6-dichloro-4-phenylmercapto-triazine, 2,6-dichloro-4-(p-methylphenyl)-mercapto-triazine, 2,6-dichloro-4-methoxyethoxy-triazine, 2,6-difluoro-4-amino-triazine, 2,6-difluoro-4-methylamino-triazine, 2,6-difluoro-4-ethylamino-triazine, 2,6-difluoro-hydroxyethylamino-triazine, 2,6-difluoro-4-phenylamino-triazine, 2,6-difluoro-4-(o-, m- or p-sulphophenyl)-amino-triazine, 2,6-difluoro-4-(2',3'-, 2',4'-, 3',4'- or 3',5'-disulphophenyl)-amino-triazine, 2,6-difluoro-4-(2'-methyl-4'-sulphophenyl)-amino-triazine, 2,6-difluoro-(2'-chloro-4'-sulphophenyl)-amino-triazine, 2,6-difluoro-(2'-methyl-5'-sulphophenyl)-amino-triazine, 2,6-difluoro-(2'-methoxy-5'-sulphophenyl)-amino-triazine, 2,6-difluoro-(2',5'-disulpho-4'-methoxyphenyl)-amino-triazine, 2,6-difluoro-(4',8'-disulphonaphth-2-yl)-amino-triazine, 2,6-difluoro-4-isopropoxy-4-triazine, 2,6-difluoro-4-methoxyethoxy-triazine, 2,6-difluoro-4-methoxy-triazine, 2,6-difluoro-4-ethoxy-triazine, 2,6-difluoro-4-phenoxy-triazine, 2,6-difluoro-4-(o-, m- or p-sulphophenyl)-hydroxytriazine, difluoro-alkylmercapto- and -arylmercapto-sym.-triazines, such as 2,6-difluoro-4-ethylmercapto-triazine, 2,6-difluoro-4-phenylmercapto-triazine and 2,6-difluoro-4-(p-methylphenyl)-mercapto-triazine, 2,6-difluoro-4-methoxyethoxy-triazine, 2,4,5,6-tetrachloropyrimidine, 2,4,6-trichloropyrimidine, 5-chloro-2,4,6-trifluoropyrimidine, 2,6-difluoro-4-methyl-5-chloropyrimidine, 2,6-difluoro-4-chloropyrimidine, 2,4-difluoro-5,6-chloropyrimidine, 2- or 3-monochloroquinoxaline-6-carboxylic acid chloride or -6-sulphonic acid chloride, 2,3-dichloroquinoxaline-6-carboxylic acid chloride or -6-sulphonic acid chloride, 2,4-dichloroquinazoline-6- or -7-carboxylic acid chloride or -7-sulphonic acid chloride, α-bromoacrylic acid chloride, acrylic acid chloride and 3-chloroethanesulphochloride.

Example 19

Dyeing Instruction 168 ml of water at 20°–25° C. are initially introduced into a dyeing beaker of 300 ml capacity, which is located in a waterbath which can be heated. 0.3 g of a dyestuff obtained according to Example 18 is thoroughly worked into a paste with 2 ml of cold water and 30 ml of hot water (70° C.) are added; hereupon the dyestuff dissolves. The dyestuff solution is added to the water initially introduced into the beaker and 10 g of cotton yarn are constantly agitated in this dyeing liquor. The temperature of the dyeing liquor was raised to 40°–50° C. in the course of 10 minutes, 10 g of anhydrous sodium sulphate are added and dyeing is continued for 30 minutes. 4 g of anhydrous sodium carbonate are then added to the dyeing liquor and dyeing is continued for 60 minutes at 40°–50° C. Thereafter, the dyed material is taken out of the dyeing liquor, the adhering liquor is removed by wringing out or squeezing out and the material is rinsed first with cold water and then with hot water, until the rinsing liquor is no longer stained. The dyed material is then again rinsed in 200 ml of a liquor which contains 0.2 g of sodium alkylsulphate, and is dried at 60°–70° C. in a drying cabinet. A brilliant turquoise dyeing having excellent fastness to washing and to light is obtained.

Printing Instruction 30 g of the dyestuff of Example 18 are dissolved in 339 ml of water and 200 g of urea, the solution is poured into 400 g of a sodium alginate thickener of about 5% strength, and 30 g of potassium carbonate and 1 g of sodium hydroxide of 36° C. Be strength are added. A cotton fabric is printed in the usual manner with the printing ink thus obtained, and is dried. The fabric is then steamed for 8 minutes at 100° to 101° C., rinsed, soaped, again rinsed and dried. A clear turquoise print having good wet fastness and light fastness results.

Padding Instruction 30 parts of a dyestuff prepared according to Example 18 are dissolved in 1,000 parts of water. A cotton fabric is padded with this solution and squeezed off to a weight pick-up of 90%. The cotton, whilst still moist, is treated for 30 minutes at 70° C. in a bath which contains 200 parts of calcined sodium sulphate and 10 parts of calcined sodium carbonate dissolved in 1,000 parts of water. The dyeing is then finished in the usual manner. A brilliant turquoise dyeing having excellent wet fastness and light fastness is obtained.

Example 20

If, following the description in Example 18, equivalent amounts of the dyestuffs prepared in Examples 2–16 are employed instead of the dyestuff prepared in Example 1, and these dyestuffs are reacted with the reactive components listed in Example 18, in accordance with the conditions described there, the valuable reactive dyestuffs shown below are obtained, which dye cotton, in accordance with one of the use examples listed, in fast brilliant torquoise shades:

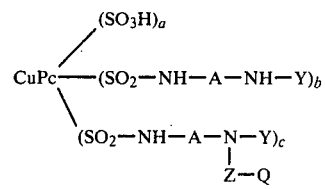

| Example | a | b | c | A | Z |
|---|---|---|---|---|---|
| 20 | 1 | 1 | 2 | —CH$_2$—CH$_2$— | —CH$_2$— |
| 21 | 2 | 1 | 1 | " | " |
| 22 | 3 | 0 | 1 | " | " |
| 23 | 0 | 2 | 2 | " | " |
| 24 | 0 | 1 | 3 | " | " |
| 25 | 0 | 3 | 1 | " | " |

-continued
| | | | | | |
|---|---|---|---|---|---|
| 26 | 0 | 1 | 2 | —CH$_2$—CH$_2$— | —CH$_2$— |
| 27 | 1 | 1 | 1 | —CH$_2$—CH$_2$— | —CH$_2$— |
| 28 | 1 | 1 | 2 | " | —CH$_2$—CH$_2$— |
| 29 | 0 | 1 | 3 | " | —CH$_2$—CH— $\vert$ CH$_3$ |
| 30 | 0 | 1 | 2 | —CH$_2$—CH$_2$—CH$_2$—CH$_2$— | —CH$_2$— |
| 31 | 0 | 1 | 2 | —CH$_2$—CH$_2$— | —CH$_2$—CH$_2$—CH$_2$—CH$_2$— |
| 32 | 1 | 1 | 2 | " | —CH$_2$—CH$_2$— |
| Example | a | b | c | Q | Y |
|---|---|---|---|---|---|
| 20 | 1 | 1 | 2 | —COOH | 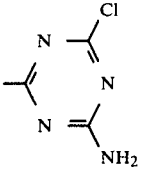 |
| 21 | 2 | 1 | 1 | " | 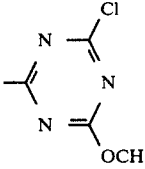 |
| 22 | 3 | 0 | 1 | " | 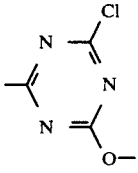 |
| 23 | 0 | 2 | 2 | " | 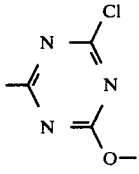 |
| 24 | 0 | 1 | 3 | " | 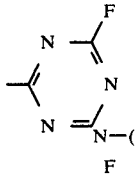 |
| 25 | 0 | 3 | 1 | " | 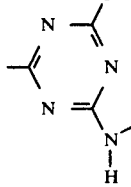 |
| 26 | 0 | 1 | 2 | —COOH | 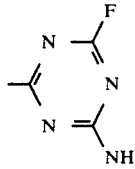 |
| 27 | 1 | 1 | 1 | —COOH | 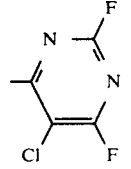 |

| | | | | | |
|---|---|---|---|---|---|
| 28 | 1 | 1 | 2 | " | 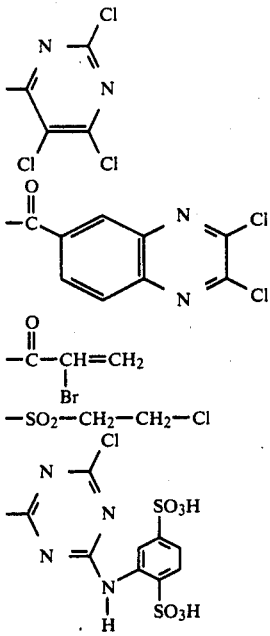 |
| 29 | 0 | 1 | 3 | " | |
| 30 | 0 | 1 | 2 | —SO$_3$H | —C(=O)—CH(Br)=CH$_2$ |
| 31 | 0 | 1 | 2 | " | —SO$_2$—CH$_2$—CH$_2$—Cl |
| 32 | 1 | 1 | 2 | —SO$_2$—NH—SO$_2$CH$_3$ | |

Example 33

113.7 g of the dyestuff prepared in Example 2 are suspended in 2,000 ml of ice water. 56 g of cyanuric chloride are sprinkled into the suspension at 0° to 5° C. and a pH of 6 is maintained by adding sodium hydroxide solution. When no further sodium hydroxide solution is consumed, the pH is brought to 9 with 17% strength aqueous NH$_3$ solution. The mixture is warmed to 40° C. and the pH is maintained at 9. The reaction is complete when no further NH$_3$ is consumed. After salting out, a valuable reactive dyestuff is isolated, which dyes cotton in a turquoise shade and is identical with the dyestuff prepared in Example 20.

Example 34

If the procedure in Example 33 is followed but methylamine, ethylamine, isopropylamine, aminoethanol, diethanolamine or o-, m- or p-methoxyaniline is employed instead of NH$_3$, valuable reactive dyestuffs are again obtained, which dye cotton, in accordance with one of the use examples described, in a turquoise colour.

Example 35

111.7 g of the dyestuff prepared in Example 7 are suspended in 2,000 ml of ice water. 74 g of cyanuric chloride are sprinkled into the suspension at 0° to 5° C. and a pH of 6 is maintained by adding sodium hydroxide solution. When no further sodium hydroxide solution is consumed, 70 g of m-sulphophenylamine are sprinkled into the mixture, the pH is brought to 9 with sodium hydroxide solution, the mixture is warmed to 40° C. and the pH is maintained at 9. The reaction is complete when no further sodium hydroxide solution is consumed. After salting out, the valuable reactive dyestuff of the formula

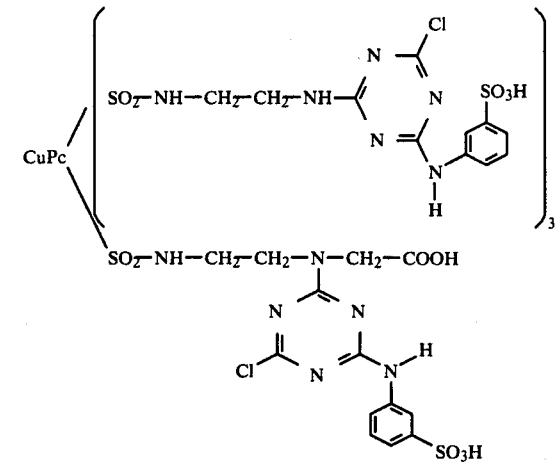

is isolated.

Example 36

If the procedure followed is as in Example 35, but o- or p-sulphophenylamine, 2,5-disulphophenylamine, aminoacetic acid or β-aminoethanesulphonic acid is employed instead of m-sulphophenylamine, valuable reactive dyestuffs are again obtained, which dye cotton, in accordance with one of the use examples described, in a turquoise colour.

Example 37

105.3 g of the dyestuff prepared in Example 8 are suspended in 2,000 ml of ice water. 40.5 g of cyanuric fluoride are sprinkled into the suspension at 0° C. and a pH of 6 is maintained by adding sodium hydroxide solution. When no further sodium hydroxide solution is consumed, the pH is brought to 9 with 17% strength aqueous NH$_3$ solution. The reaction is complete when no further NH$_3$ is consumed. After salting out, a valuable reactive dyestuff is isolated, which dyes cotton in a turquoise shade and is identical with the dyestuff prepared in Example 26.

Example 38

If the procedure in Example 37 is followed, but methylamine, ethylamine, isopropylamine, aminoethanol, diethanolamine or o-, m- or p-methoxyaniline is employed instead of $NH_3$, valuable reactive dyestuffs are again obtained, which dye cotton, in accordance with one of the use examples described, in a turquoise colour.

Example 39

111.7 g of the dyestuff prepared in Example 7 are suspended in 2,000 ml of ice water. 54 g of cyanuric fluoride are sprinkled into the suspension at 0° C. and the pH is maintained at 6 by adding sodium hydroxide solution. When no further sodium hydroxide solution is consumed, 70 g of m-sulphophenylamine are sprinkled into the mixture and the pH is brought to 9 with sodium hydroxide solution. The reaction is complete when no further sodium hydroxide solution is consumed. After salting out, a valuable reactive dyestuff is isolated, which is identical with the dyestuff prepared in Example 25.

Example 40

If the procedure in Example 35 is followed, but o- or p-sulphophenylamine, 2,5-disulphophenylamine, aminoacetic acid or β-aminoethanesulphonic acid is employed instead of m-sulphophenylamine, valuable reactive dyestuffs are again obtained, which dye cotton, in accordance with one of the use examples described, in a turquoise colour.

Example 41

113 g of the dyestuff prepared in Example 17 are suspended in 1,000 ml of $H_2O$. 56 g of cyanuric chloride are sprinkled into the suspension at 0° to 5° C. and the pH is maintained at 6 by adding sodium hydroxide solution. When no further sodium hydroxide solution is consumed, the pH is brought to 9 with 17% strength aqueous $NH_3$ solution. The mixture is warmed to 40° C. and the pH is maintained at 9. The reaction is complete when no further $NH_3$ is consumed. After salting out, the valuable reactive dyestuff of the formula $$NiPc\begin{pmatrix}SO_3H\\SO_2-NH-CH_2-CH_2-NH-\underset{N=}{\overset{N}{\bigvee}}\underset{NH_2}{\overset{Cl}{\bigvee}}\\ \left[SO_2-NH-CH_2-CH_2-N-CH_2-COOH\atop \underset{Cl}{\overset{N}{\bigvee}}\underset{NH_2}{\overset{N}{\bigvee}}\right]_2\end{pmatrix}$$

is isolated; following one of the use examples listed, this dyestuff gives wash-fast and light-fast dyeings, in a very strongly greenish-tinged turquoise shade, on cotton.

Further valuable reactive dyestuffs are obtained if in Example 17 methylamine, ethylamine, isopropylamine, aminoethanol, diethanolamine, o-, m- or p-methoxyaniline, piperidine or morpholine is used instead of $NH_3$.

We claim:

1. Phthalocyanine reactive dyestuffs of the formula $$Pc\begin{pmatrix}(SO_3H)_a\\(SO_2-\underset{H}{N}-A-\underset{H}{N}-Y)_b\\(SO_2-\underset{H}{N}-A-\underset{Z-Q}{N}-Y)_c\end{pmatrix}$$

wherein
Pc = the radical of a phthalocyanine,
A = an alkylene radical with at least 2 C atoms,
Z = an alkylene radical,
Y = a reactive group,
Q = a carboxyl, sulfide, sulphate or disulphimide group,
a = 0–2,
b = 0–2,
c = 1–4 and
a+b+c ≦ 4.

2. Phthalocyanine reactive dyestuffs of the formula $$Pc\begin{pmatrix}(SO_2H)_a\\(SO_2-\underset{H}{N}-CH_2-CH_2-\underset{H}{N}-Y)_b\\(SO_2-\underset{H}{N}-CH_2-CH_2-\underset{CH_2-COOH}{N}-Y)_c\end{pmatrix}$$

wherein Pc, Y, a, b and c have the meaning given in claim 1.

3. Phthalocyanine reactive dyestuffs of the formula $$Pc\begin{pmatrix}(SO_3H)_a\\(SO_2-\underset{H}{N}-CH_2-CH_2-\underset{H}{N}-Y_1)_b\\(SO_2-\underset{H}{N}-CH_2-CH_2-\underset{CH_2-COOH}{N}-Y_1)_c\end{pmatrix}$$

wherein Pc, a, b and c have the meaning given in claim 1 and $Y_1$ represents the 2,4-dichloro-triazinyl-6 radical.

4. Phthalocyanine reactive dyestuffs of the formula $$Pc\begin{pmatrix}(SO_3H)_a\\(SO_2-\underset{H}{N}-CH_2-CH_2-\underset{H}{N}-Y_2)_b\\(SO_2-\underset{H}{N}-CH_2-CH_2-\underset{CH_2-COOH}{N}-Y_2)_c\end{pmatrix}$$

wherein Pc, a, b and c have the meaning given in claim 1 and $Y_2$ represents a monofluorotriazinyl-6 radical.

5. Phthalocyanine reactive dyestuffs of the formula

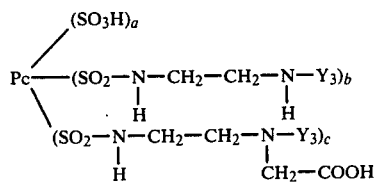
wherein Pc, a, b and c have the meaning given in claim 1 and $Y_3$ represents a mono-, di- or tri-halogenopyrimidininyl radical.
6. Phthalocyanine reactive dyestuffs of the formula
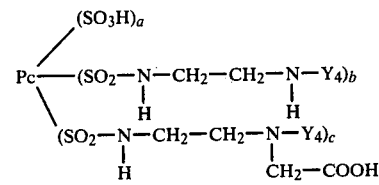
wherein Pc, a, b and c have the meaning given in claim 1 and $Y_4$ represents a monochlorotriazinyl-6 radical.
* * * * *